June 23, 1931.  J. K. KOSTKO  1,811,136

SYNCHRONOUS MOTOR

Filed Sept. 11, 1926

Inventor:
JAROSLAW K. KOSTKO,
By Chas. E. ~~~~
His Attorney.

Patented June 23, 1931

1,811,136

UNITED STATES PATENT OFFICE

JAROSLAW K. KOSTKO, OF FERGUSON, MISSOURI

SYNCHRONOUS MOTOR

Application filed September 11, 1926. Serial No. 134,845.

My invention relates to synchronous motors, i. e., to machines which are capable of carrying variable load at synchronous speed, and more particularly to so-called synchronous-induction motors, which designation is given to machines capable of operating at synchronous speed over one range of loads and at a non-synchronous speed over another range of loads. Such machines usually possess the mechanical features of non-synchronous motors.

The objects and features of this invention will appear from the description and drawings and will be more particularly pointed out in the claims.

Figure 1:
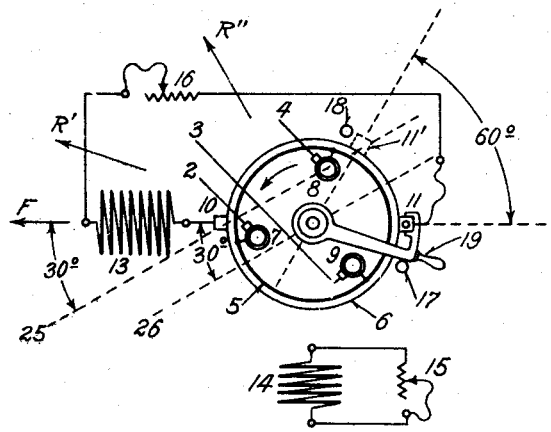
Figure 2:
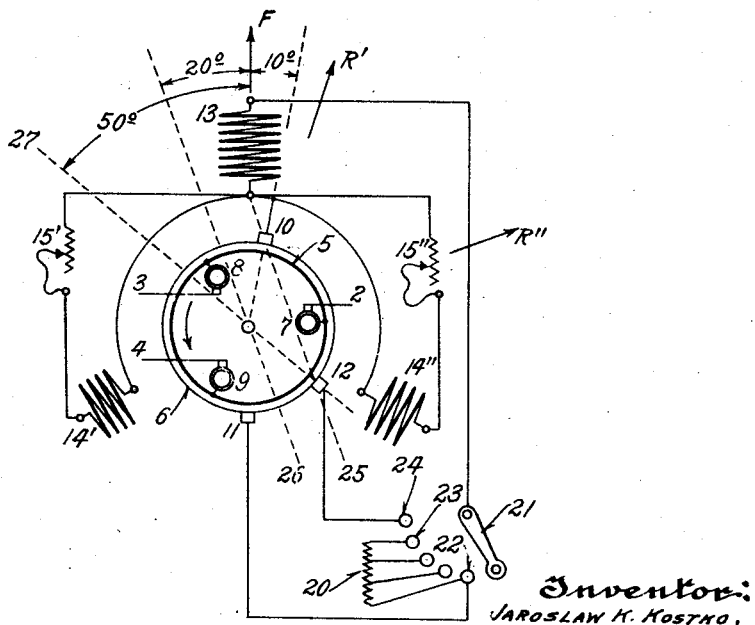

The accompanying diagrammatic drawings, Figs. 1 and 2, show two-pole synchronous motors embodying my invention.

Referring to Fig. 1, the revolving member, here the primary, carries a three-phase winding 5 adapted to be connected to the supply 2, 3, 4 by means of the sliprings 7, 8, 9 and brushes cooperating therewith. The primary also carries a commuted winding 6 with which cooperate the brushes 10, 11. In the drawing the brushes are shown as resting directly on the commuted winding 6. In practice a commutator would, of course, be interposed. The brush 10 is stationary but the brush 11 is insulatingly held in a brush rocker 19 capable of circumferential displacement. The travel of the brush rocker is limited by stops 17 and 18 which can be adjustable so as to change the limits within which the brush 11 can be displaced. The stationary member, here the secondary, carries a winding 13 connected to the brushes 10, 11 with the interposition of the adjustable resistance 16 and a winding 14 displaced from 13 by 90 electrical degrees and adapted to be closed over the adjustable resistance 15. In the position shown, the axis of the brushes 10, 11 coincides with the axis of the winding 13 and said brushes span 180 electrical degrees. When the brush 11 is moved to the position 11' determined by the stop 18 then the span of the brushes is reduced to about 120 electrical degrees and the axis of said brushes now deviates from the axis of the winding 13 by 30 electrical degrees. The dotted line 26, down through the center of the rotor and parallel to the line 25 which joins the central points of contact between the brushes and the winding 6 is the axis of the displaced brushes.

In Fig. 2 the rotor is again the primary and carries the three-phase winding 5 and the commuted winding 6. The stator, here the secondary, carries a three-phase winding the phase 13 of which corresponds to the winding 13 of Fig. 1 and the phases 14' and 14" of which are adapted to be closed over the adjustable resistances 15' and 15". Three brushes 10, 11, 12, cooperate with the commuted winding 6 and are displaced one from the other. The brush 11 stands in the axis of the winding 13. The brush 10 is displaced from that axis by 10 electrical degrees and the brush 12 is displaced by 50 electrical degrees from the brush 11 and by 120 electrical degrees from the brush 10. The brush 10 is connected to one end of the winding 13, while the other end of this winding is connected to the switch blade 21. This switch blade makes it possible to connect one end of 13 to brush 11 or to brush 12 and the connection to brush 11 can be made directly or through the interposition of more or less of the adjustable resistance 20.

Turning to the operation of the improved motor and referring more particularly to Fig. 1, the primary 5 is connected to the supply 2, 3, 4, thus causing the primary to produce a flux which revolves synchronously with respect to said primary, say in a clockwise direction. This flux is adapted to generate induction-motor-torque producing ampereturns in the windings 13 and 14. To enable it to do so, the circuits of said windings are closed over the adjustable resistances 16 and 15, said resistances being adjusted to cause the machine to develop the desired starting torque and it is preferred to so make these adjustments that the ampereturns in the two windings are approximately the same at starting. The machine starts like an induction motor and the primary revolves in a direction opposed to the rotation of the revolving flux; in this case the primary moves counterclockwise. As the motor gather's speed, the resistances 15 and 16 are reduced to zero in one or more steps. As synchronism is approached the induction-motor-torque producing ampereturns diminish and become zero at synchronism but the brush or auxiliary voltage impressed on the secondary winding 13 produces conduced ampereturns in said winding, the magnitude of which is maintained as synchronism is approached and these conduced ampereturns develop in cooperation with the synchronously revolving flux an additional torque to which I will refer as the synchronizing torque. To make this torque as large and as effective as the number of turns and the resistance of the winding 13 will permit, I hold the brush 11 in the position shown in the figure during the synchronizing period and release said brush after the machine has stepped into synchronism. I hold the brush 11 by means of the brush rocker arm 19 so that the axis of the brushes 10, 11 substantially coincides with the axis of 13 and so that said brushes span about 180 electrical degrees. Upon release of the brush holder 19 the friction between the commutator and the brush 11 caused by the rotation of the primary carries the brush in a counterclockwise direction until it comes to occupy the position 11′ determined by the stop 18. After the motor stops the brush 11 is returned to its synchronizing position by gravity. It is not necessary to rely on friction and on the motor speed for carrying the brush 11 to the position 11′, this change can, for instance, be made by hand.

It is seen that during the synchronizing period I impress on the winding 13 the maximum available amplitude of the auxiliary voltage generated in the commuted winding 6 and while impressing this maximum amplitude I hold the brush axis substantially coaxial with the axis of 13. After synchronization I not only cause the brush axis to deviate from the axis of 13 but I also limit the amplitude of the auxiliary voltage which can thereafter be impressed on 13 without, however, influencing the maximum amplitude of the voltage generated in 6. This last is achieved by causing the brushes 10, 11 to span less than 180 electrical degrees of the winding 6 or of its commutator.

The auxiliary or brush voltage is generated in the commuted winding 6 by the revolving flux set up by the primary winding 5, which flux always revolves synchronously with respect to 6 and quite independently of the speed of the primary member. As this voltage appears at the brushes 10, 11 it is always of slip frequency, being of line frequency when the revolving member is at rest and of zero frequency when said member revolves synchronously. The auxiliary voltage is, therefore, always of the same frequency as the voltage generated in 13 by the revolving flux. After the initial stages of the starting operation the revolving flux of the machine remains practically constant in magnitude with the result that the maximum available amplitude of said voltage also remains constant. This maximum available amplitude can be secured only when the brushes are displaced by 180 electrical degrees and occurs whenever the revolving flux of the motor is at right angles to or is displaced by 90 electrical degrees from the brush axis. At subsynchronous speeds the axis of the resultant revolving flux moves constantly with respect to the brush axis and always at slip speed. At synchronism the axis of said flux moves spasmodically with respect to the brush axis, moving in one direction with decreasing load and in the opposite direction with increasing load and the maximum value or the maximum amplitude of the auxiliary voltage when the latter is unidirectional also occurs when the resultant revolving flux of the machine occupies a quadrature space relation with respect to the axis of a pair of brushes displaced by 180 electrical degrees.

Even the maximum available amplitude of the auxiliary voltage is small with respect to the amplitude of the voltage generated in the winding 13 when the motor is at rest and the auxiliary voltage has, therefore, little effect on the starting performance of the machine. But, very near synchronism, the auxiliary voltage is many times greater than the generated voltage which then approaches zero, with the result that, near synchronism, the auxiliary voltage becomes the determining factor insofar as the ampereturns in 13 are concerned.

The commuted winding 6 cooperating with the resultant revolving flux of the machine is the source of the auxiliary voltage. The stationary brushes 10, 11 cooperating with 6 change the frequency of the auxiliary voltage and can be used to limit its amplitude for a given magnitude of revolving flux or to change its phase with relation, for instance, to the phase of the voltage concurrently generated in 13. The change in phase is brought about by displacing the axis of the brushes and the change in or limitation of the amplitude is brought about by causing said brushes to span a greater or a smaller arc of the commuted winding 6 or of the commutator cooperating therewith. The operating conditions brought about by the arrangement described in connection with Fig. 1 can, therefore, also be expressed by saying that I synchronize my improved motor by impressing on the winding 13 the maximum available amplitude of the auxiliary voltage and by adjusting, near synchronism, the phase of the auxiliary voltage to practically coincide with the phase of the voltage concurrently generated in 13 by the revolving flux of the motor. Since, very near synchronism, the current generated in 13 is practically in phase with the voltage generated therein, it is immaterial whether the adjustment of the phase of the auxiliary voltage is expressed by reference to the current or to the voltage generated in 13 by the revolving flux of the motor. After synchronization I change the axis of the brushes with respect to the axis of 13, such a change brings about an alteration in the phase of the auxiliary voltage with respect to the phase of the voltage generated in 13 whenever the machine lapses into asynchronism, as continuously happens when the synchronous load changes.

The character of the synchronous operation of a motor of the type shown in Fig. 1, in other words, the manner in which the unidirectional ampere turns on its secondary vary with varying load and the consequent configuration of the power-factor-load curve, depends, primarily, on the angular relation between the brush axis and the axis of that winding 13 to which said brushes are connected. For a given angular relation between the brush axis and the axis of 13 the maximum synchronous torque, and therefore load, of the machine depends on the number of turns in 13, on the resistance of the circuit comprising 13 and on the amplitude or value of the auxiliary voltage available during synchronous operation. Any maximum torque within the limits of any given frame can, therefore, be secured, for a given angular displacement of the brushes, merely by designing the winding 13 with a sufficiently large number of turns of sufficiently low ohmic resistance. The maximum synchronous torque does not necessarily occur at the time when the ampereturns in 13 are at a maximum. The maximum synchronous torque in any motor is a fixed quantity whereas the full load torque of the machine may, for the same maximum torque, have one value or another according to the preference of the designer or of the user and may justifiably be changed whenever the conditions of load or of surroundings under which a given motor is to operate are changed. Of course, the maximum synchronous torque of the machine can be changed at any time by the use of an external resistance such as 16, but such a proceeding is much too wasteful except at starting. Just how wasteful is easily recognized when it is realized that the ampereturns on the secondary of a synchronous motor must exceed the primary ampereturns if the motor is to operate with a nearly unity or with a leading power factor. One object of my invention is to control the operating characteristic of the machine independently of the use of an external resistance in the circuit of 13. This I achieve by changing the angular relation between the axis of 13 and the brush axis, and, when necessary, also by changing the available amplitude of the auxiliary voltage.

Having settled upon a certain synchronous operating characteristic, it often happens, for instance in case the motor drives very heavy machinery, that a synchronizing torque becomes necessary which is in excess of that which corresponds to the organization of the elements of the motor which insures the desired operating characteristic. Another object of my invention is to overcome this difficulty and I achieve this object either by temporarily disturbing the angular relation between the axis of 13 and the brush axis, or by temporarily increasing the maximum conduced ampereturns in 13, or by combining both of these means. That way of accomplishing this result which is shown in Fig. 1 comprises bringing the phase of the auxiliary voltage into substantial coincidence with the phase, and therefore with the direction, of the induction-motor-torque producing ampereturns concurrently present in 13, and in increasing the amplitude of the auxiliary voltage above that available when the different elements of the motor are organized for synchronous operation. After the motor has reached synchronism I reinstate the angular relations suitable for the desired synchronous operating characteristic and I lower the limit of the amplitude of the auxiliary voltage.

As a rule motors of the type herein dealt with will be required to operate synchronously with the axis of the brushes not coinciding with the axis of the secondary winding to which they are connected, but displaced therefrom in a direction opposed to the direction of rotation of the resultant revolving flux of the machine by an angle which varies between about 15 degrees and about 35 degrees, angles materially smaller than 10 often leading to somewhat unstable operation. But, whatever the operating angle I can always materially increase my synchronizing torque and certainly increase it enough to meet any conditions likely to be met with in practice, either by displacing the brush axis or by displacing said brush axis and by increasing the spread or the angular displacement of the brushes, to this end I prefer to dimension the winding 13 for synchronous operation with the brushes spanning less than 180 electrical degrees. I can increase my synchronizing torque as stated, for the reason that the magnitude of the synchronizing torque depends not only on the magnitude of the auxiliary voltage but on the phase relation of same with respect to the phase of the voltage concurrently generated by the revolving flux in the secondary winding on which said auxiliary voltage is impressed. In other words, the amplitude of the synchronizing torque depends not only on the spread of the brushes but also on the angular relation of the brush axis with respect to the axis of 13. The greater the auxiliary voltage the greater the amplitude of the synchronizing torque for any phase relation or any brush position. For a given magnitude of auxiliary voltage the synchronizing torque is a maximum when the brush axis coincides with the axis of the secondary winding to which said brushes are suitably connected, or, when the phase of the auxiliary voltage coincides with the phase of the voltage concurrently generated by the revolving flux of the machine in the secondary winding on which said auxiliary voltage is impressed. Slight departures from phase coincidence or axis coincidence have practically no influence on the magnitude of the synchronizing torque.

Referring to Fig. 2, in order to start the machine I connect the sliprings 7, 8, 9 to the supply 2, 3, 4 by means of the brushes cooperating with said sliprings, thus producing a magnetization by means of the winding 5 which revolves synchronously with respect to said winding and to 6. This revolving flux generates voltages in the secondary windings 13, 14′ and 14″, and by closing these windings over more or less of the resistances 20, 15′ and 15″ respectively I can start the machine like an ordinary polyphase induction motor, reducing the resistances 20, 15′ and 15″ to zero in one or more steps. As the induction-motor-torque producing ampereturns in 13, 14′ and 14″ approach zero, which happens when the revolving member of the motor approaches synchronism, the auxiliary voltage appearing at the brushes 10, 11 becomes preponderant and sets up conduced ampereturns in the winding 13 which are of practically the same phase and direction as the fast decreasing induction-motor-torque producing ampereturns generated in 13 by the revolving flux. These conduced ampereturns synchronize the machine in conjunction with the resultant revolving flux of the latter. While the brush 11 is in the axis of the secondary winding 13, the brush 10 is displaced from that axis against the direction of rotation of the rotor, here the primary, by some 10 degrees. This amounts to an angular displacement of 5 electrical degrees of the axis of the brushes 10, 11 from the axis of 13. This displacement is not sufficient to materially influence the magnitude of the synchronizing torque. Because the brushes 10, 11 span 170 instead of 180 electrical degrees, the amplitude of the auxiliary voltage impressed on 13 is just a little short of the maximum available but the difference is so small as to be without material influence on the amplitude of the synchronizing torque. After the machine has reached synchronism the switch blade 21 stands on point 22 and the resistances 15′ and 15″ are shortcircuited. In order to reorganize the elements of this motor so as to bring about the standard synchronous operating conditions which in this case are supposed to require a limiting amplitude of the auxiliary voltage which is less than the limiting amplitude said voltage had during the synchronizing period, and in order to cause the brush axis in synchronous operation to be displaced, for instance, by 20 electrical degrees with respect to the axis of 13, and against the rotation of the resultant revolving flux of the machine, it is possible to leave one end of the winding 13 connected to the brush 10 and to connect the other end of 13 to brush 12 instead of to brush 11. In this case the brush 12 is displaced by 50 electrical degrees from the brush 11 against the direction of rotation of the resultant revolving flux of the machine. To make this change progressive and gradual the switch blade 21 is slowly moved from contact 22 to contact 24. During this movement more and more of the resistance 20 is included in the circuit of 13 and when the switch blade reaches point 23 the current in 13 is reduced to just about the value it will have when the switch blade 21 stands on contact 24 and, therefore, connects the winding 13 directly across the brushes 10 and 12. By selecting the resistance 20 in this wise, the transition from brush 11 to brush 12 can be made as gradual as desired. When the switch blade 21 stands on 24 the machine is organized for normal synchronous operation with the reduced voltage available at the brushes 10, 12 impressed on 13. When the winding 13 is connected to the brushes 10, 11 there exists a certain phase relation between the slip frequency auxiliary voltage and the slip frequency voltage generated in 13 by the revolving flux. When the axis of the brushes is displaced by displacing a brush as in Fig. 1, this phase relation is changed. This change in phase relation is brought about in Fig. 2 by changing the connections between 13 and the brushes from the set consisting of brushes 10, 11 to the set consisting of brushes 10, 12. In this case the change in phase relation is brought about without moving the brushes, simply by changing connections. If but two brushes are used a simple reversal of connections between the winding and said brushes will also change the phase relation in question. The windings 14′ and 14″ are preferably left shortcircuited so that they may become active in case the machine is pulled out of synchronism momentarily or otherwise and owing to overload or to some other reason.

When but one brush is displaced, as for instance in Fig. 1, the adjustments can be made much more accurately than if both brushes are displaced for the reason that a single brush must be displaced through 20 degrees to get the same adjustment as would be secured if both brushes were displaced through 10 degrees and so on. The possibility of accurate displacement is often of considerable practical advantage.

In synchronous operation of the embodiments shown in Figs. 1 and 2, the winding 13 produces a unidirectional magnetization F from the secondary which is coaxial with 13, while the primary produces a magnetization P which is unidirectional with respect to the secondary but revolves synchronously with respect to the primary. The resultant motor magnetization R is the vectorial sum of F and P. At no-load the axis of R may coincide with that of F but it usually diverges somewhat from the latter as shown by R' in Figs. 1 and 2. When the primary revolves R' falls ahead of F in the direction of rotation of the revolving flux set up by the primary and the same is true when the secondary is the revolving member. At no-load R makes an angle with the brush axis 26 which is less than 90 and the amplitude of the brush voltage is, therefore, less than the maximum which corresponds to the brush span in use. As the load increases R increases its lead on F, gradually or spasmodically according to the manner in which the load increases. For a given load R may come to occupy the position indicated by R''. At such time the brush voltage is a maximum because R'' is perpendicular to the brush axis 26 but the brush voltage is not equal to the available maximum unless the brushes span 180 electrical degrees or practically so.

My invention is by no means limited to a single set of brushes connected to a secondary winding or windings magnetizing along one axis, it can be duplicated or reproduced any number of times. Thus two or three displaced sets of brushes can be connected to two or three displaced windings or sets of windings and each set of brushes manipulated as here described.

I prefer to apply my invention to motors without distinct polar projections on either rotor or stator. Whether the primary revolves or is stationary is immaterial insofar as the principle of operation is concerned, but a change to a stationary primary, of course, involves well understood structural modifications.

While theories have been advanced as to operation of the machines and methods here described, this has been done with a view to facilitating the description thereof, and it is to be understood that I do not bind myself to these or any other theories.

It will be clear that various changes may be made in this disclosure without departing from the spirit of this invention, and it is, therefore, to be understood that this invention is not to be limited to the specific details here shown and described.

What I claim is:

1. The method of operating a motor which carries variable load at synchronous speed, comprising, producing a primary flux which revolves with respect to the primary, causing the primary flux to generate induction-motor-torque producing ampereturns in a winding on the secondary, producing an auxiliary voltage which is of slip frequency below synchronism, of an amplitude independent of its frequency, and which becomes unidirectional at synchronism, impressing below synchronism the auxiliary voltage on the secondary winding carrying the induction-motor-torque producing ampereturns, synchronizing the motor by adjusting the phase of the auxiliary voltage to approximately coincide, very near to synchronism, with the phase of the induction-motor-torque producing ampereturns, and thereafter limiting the amplitude of the auxiliary voltage to less than that which was available during synchronization.

2. The method of operating a motor which carries variable load at synchronous speed, comprising, producing a primary flux which revolves with respect to the primary, causing the primary flux to generate induction-motor-torque producing ampereturns in a winding on the secondary, producing an auxiliary voltage which is of slip frequency below synchronism, of an amplitude independent of its frequency, and which becomes unidirectional at synchronism, impressing below synchronism the auxiliary voltage on the secondary wnding carrying the induction-motor-torque producing ampereturns, synchronizing the motor by adjusting the phase of the auxiliary voltage to approximately coincide, very near to synchronism, with the phase of the induction-motor-torque producing ampereturns to synchronize the motor with an alternating synchronizing torque having unequal positive and negative maxima, and thereafter modifying the adjustment which was made to secure approximate phase coincidence between auxiliary voltage and induction-motor-torque producing ampereturns.

3. The method of operating a motor which carries variable load at synchronous speed, comprising, producing a primary flux which revolves with respect to the primary, causing the primary flux to generate induction-motor-torque producing ampereturns in a winding on the secondary, producing an auxiliary voltage which is of slip frequency below synchronism, of an amplitude independent of its frequency, and which becomes unidirectional at synchronism, impressing the auxiliary voltage on the same winding on the secondary at one speed in one phase relation with respect to the voltage concurrently generated in said winding by the primary flux, and at another speed impressing the auxiliary voltage on the same winding in another phase relation with respect to the generated voltage.

4. An alternating current motor which carries variable load at synchronous speed, having a primary member adapted to produce a flux revolving synchronously with respect to said primary, a commuted winding on the primary, a secondary, brushes cooperating with said commuted winding to make available an auxiliary voltage which is of slip frequency at sub-synchronous speeds and becomes unidirectional at synchronism, a winding on the secondary in inductive relation to the primary and in circuit with the brushes, and means for changing the arc spanned by the brushes when synchronizing the motor.

5. An alternating current motor which carries variable load at synchronous speed, having a primary member adapted to produce a flux revolving synchronously with respect to said primary, a commuted winding on the primary, a secondary, brushes cooperating with said commuted winding to make available an auxiliary voltage which is of slip frequency at sub-synchronous speeds and becomes unidirectional at synchronism, a winding on the secondary in inductive relation to the primary and in circuit with the brushes, and means for displacing one brush with respect to the other brush when synchronizing the motor.

6. An alternating current motor which carries variable load at synchronous speed, having a primary member adapted to produce a flux revolving synchronously with respect to said primary, a commuted winding on the primary, a secondary, brushes cooperating with said commuted winding to make available an auxiliary voltage which is of slip frequency at sub-synchronous speeds and becomes unidirectional at synchronism, a winding on the secondary in inductive relation to the primary and in circuit with the brushes, means for causing the axis of the brushes to occupy a certain space position with respect to the axis of the secondary winding at sub-synchronous speeds, and means dependent on the motion of the revolving member of the motor for causing the brush axis to thereafter occupy a different space position with respect to the axis of said secondary winding.

7. An alternating current motor which carries variable load at synchronous speed, having a primary member adapted to produce a flux revolving synchronously with respect to said primary, a commuted winding on the primary, a secondary, brushes cooperating with said commuted winding to make available an auxiliary voltage which is of slip frequency at sub-synchronous speeds and becomes unidirectional at synchronism, a winding on the secondary in inductive relation to the primary and in circuit with the brushes, said secondary winding being dimensioned to enable the motor to develop the desired maximum synchronous torque for a given space relation between the axis of said secondary winding and the axis of the brushes and for a given angular displacement between the brushes, and means for displacing the axis of the brushes and simultaneously increasing the magnitude of the brush voltage when synchronizing the motor.

8. An alternating current motor which carries variable load at synchronous speed, having a primary member adapted to produce a flux revolving synchronously with respect to said primary, a secondary, a commutator on the primary adapted to make available an auxiliary voltage which is of slip frequency at sub-synchronous speed and becomes unidirectional at synchronism, a winding on the secondary in inductive relation to the primary, and means operable during operation of the motor for connecting said secondary to the commutator at points displaced by about 180 electrical degrees and at points located along another axis and displaced by another angle.

9. An alternating current motor which carries variable load at synchronous speed, having a primary member adapted to produce a flux revolving synchronously with respect to said primary, a commuted winding on the primary, a secondary, brushes cooperating with said commuted winding to make available an auxiliary voltage which is of slip frequency at sub-synchronous speeds and becomes unidirectional at synchronism, a winding on the secondary in inductive relation to the primary and in circuit with the brushes, and means for displacing the axis of the brushes when synchronizing the motor.

10. An alternating current motor which carries variable load at synchronous speed, having a primary member adapted to produce a flux revolving synchronously with respect to said primary, a commuted winding on the primary, a secondary, brushes cooperating with said commuted winding to make available an auxiliary voltage which is of slip frequency at sub-synchronous speeds and becomes unidirectional at synchronism, a winding on the secondary in inductive relation to the primary and in circuit with the brushes, said secondary winding being dimensioned to enable the motor to develop the desired maximum synchronous torque for a given space relation between the axis of said secondary winding and the axis of the brushes and for a given angular displacement between the brushes, and means for displacing the brushes when synchronizing the motor.

11. An alternating current motor which carries variable load at synchronous speed, having a primary adapted to produce a flux revolving synchronously with respect to said primary, a secondary, a source of auxiliary voltage which is of slip frequency at sub-synchronous speed and which becomes unidirectional at synchronism, a winding on the secondary having a slip frequency voltage generated in it by the primary flux at sub-synchronous speeds, connections for impressing the auxiliary voltage on the secondary winding in a certain phase relation to the voltage generated in the secondary winding, and means for changing the phase relation between auxiliary and generated voltages when synchronizing the motor.

In testimony whereof I affix my signature this 8th day of September, 1926.

JAROSLAW K. KOSTKO.